(12) United States Patent
Ruggiero

(10) Patent No.: US 9,368,948 B2
(45) Date of Patent: Jun. 14, 2016

(54) TIME SAVER MODULAR ELECTRICAL SWITCH

(71) Applicant: Alexander Ruggiero, Manalapan, NJ (US)

(72) Inventor: Alexander Ruggiero, Manalapan, NJ (US)

(*) Notice: Subject to any disclaimer, the term of this patent is extended or adjusted under 35 U.S.C. 154(b) by 0 days.

(21) Appl. No.: 14/526,442

(22) Filed: Oct. 28, 2014

(65) Prior Publication Data

US 2015/0096875 A1    Apr. 9, 2015

Related U.S. Application Data

(63) Continuation-in-part of application No. 13/859,730, filed on Apr. 10, 2013.

(60) Provisional application No. 61/902,100, filed on Nov. 8, 2013, provisional application No. 61/687,900, filed on May 3, 2012.

(51) Int. Cl.
*H02G 3/08* (2006.01)
*H01H 9/08* (2006.01)

(52) U.S. Cl.
CPC ............... *H02G 3/086* (2013.01); *H01H 9/08* (2013.01); *H02G 3/081* (2013.01)

(58) Field of Classification Search
CPC ...... H01R 25/006; H01R 24/70; H01R 13/00; H02G 3/08; H02G 3/081; H02G 3/083; H02G 3/085; H02G 3/16; H01H 1/5866
USPC ............ 174/520, 559, 50.56, 50.6, 53–56, 59
See application file for complete search history.

(56) References Cited

U.S. PATENT DOCUMENTS

| | | | | |
|---|---|---|---|---|
| 4,958,048 A * | 9/1990 | Bell | | 174/53 |
| 5,619,013 A * | 4/1997 | Jorgensen | | 174/53 |
| 6,220,897 B1 * | 4/2001 | Maxwell | | 439/652 |
| 7,204,696 B1 * | 4/2007 | Libby et al. | | 439/52 |
| 7,628,643 B2 * | 12/2009 | Pyrros | | 439/535 |
| 2002/0185296 A1 * | 12/2002 | Schultz et al. | | 174/53 |

* cited by examiner

*Primary Examiner* — Jenny L Wagner
*Assistant Examiner* — Jessey R Ervin

(57) ABSTRACT

A method and apparatus that allows full view of all connections while electrical switches are installed and operating. After the initial or first switch is installed, the remaining switches are installed and connected modularly. At any time, before, during, or after a complete installation, any of the switches can be changed to control a different device, without connecting or disconnecting any wires.

11 Claims, 7 Drawing Sheets

TIME SAVER MODULAR ELECTRICAL SWITCH

CROSS-REFERENCE TO RELATED APPLICATIONS

This application claims priority to U.S. Provisional application Ser. No. 61/902,100 filed on Nov. 8, 2013, entitled Time Saver Modulator Electrical Switch. This application is a continuation-in-part of U.S. patent application Ser. No. 13/859,730 filed on Apr. 10, 2013, entitled Universal Electrical box, which claims priority to U.S. Provisional Patent Ser. No. 61/687,900 filed on May 3, 2012, entitled Universal Electrical Box, the contents of which are relied upon and incorporated herein by reference in their entirely.

BACKGROUND OF THE INVENTION

1. Field of the Invention

The present invention relates to systems and devices for the interconnection of wires to switches within junction boxes. More particularly, the present invention relates to the structure of the wire connection system and the manner in which it connects wires to a switch, and the connection of switches to other switches, within the confines of a junction box.

2. Prior Art Description

Most building codes require that all connections between wires, switches, receptacles and/or any other hardwired component be contained within some form of fire retardant junction box. Traditionally, such junction boxes are made of metal or polyvinylchloride (PVC). Such junction boxes contain various punch-out structures that enable a variable number of wires to be led into the junction box. During rough construction, the junction boxes are mounted within various walls of the building.

The wires are then run between the junction boxes. Depending upon the circuit design being installed by an electrician, it is common for various wires to be directly interconnected within a junction box. Such wire-to-wire connections are traditionally made using wire nuts. To make such a connection, wires are twisted together in front of a junction box. The twisted wires are capped with a wire nut. The wire nut and the wires are then bent back into the confines of the junction box. However, as the wires are manipulated back into the junction box, sometimes the wires separate under the wire nut and the connection fails. An electrician must then inspect all the connections in the circuit to discover where the break has occurred.

To complicate matters, wire connections often cannot be readily observed within the confines of a junction box. Wires connected to a receptacle or switches are blocked from view behind the receptacle or switch.

Likewise, wires connected together with a wire nut behind a switch or receptacle are also blocked from view. As such, a separated connection is often impossible to determine by visually inspecting the junction boxes. Rather, the only way to fix the problem is to open and remove the contents of all of the junction boxes in the failed circuit until the faulty connection is identified.

Today, if you have one switch or several switches, positioned side by side, each fixture, a light or a fan for example, has to be directly attached or "hard wired" to a switch. Prior to recent changes, the neutral (white) wire was sometimes used as a black power line and painted black to indicate same. Small lengths of ground wire, with a ground screw attached, known as a pig tail, has to be used. Wire nuts have to be used for neutral, ground, and hot wire connections. These wires are then pushed to the back of the box. With the cover plate OFF, and the power ON, it remains a shock hazard. Once installed, wires have to be disconnected and reconnected to change which switch controls what fixtures. Wires also have to be separated in order to disconnect a line. Separate wires also have to be installed, to connect each switch to other switches, for power and electrical continuity. During the initial or rough installation, all electrical lines need to be marked to indicate what fixture they control, and the position of each switch in the junction box has to be noted. In addition, when ceiling lights or fans are installed, they must be temporarily supported, while electrical connections are made. At this rough installation stage, once all the junction boxes are installed, and all the wires are led into each junction box, only the ground wires are connected to each other and all grounding components. Work has to stop in order for an electrical inspector to observe; proper installation of all parts, and more importantly, to observe that the grounding connections are done properly. If receptacles and switches were installed at this time, an inspector could not see the grounding connections, or any of the other connections.

Over the years, many devices have been invented in an attempt to simplify the wiring of difficult types of electrical termination devices. However, these prior art devices are typically application specific, and can only be used as either a switch box or a receptacle box. Prior art devices that show modular connections are exemplified by U.S. Pat. No. 6,563,049 to Lindy Lawrence May, entitled Modular Electrical System; U.S. Pat. No. 7,762,838 to Gorman, entitled Safety Module Electrical Distribution; U.S. Pat. No. 8,649,133 to Benoit, Weeks, Savicki, entitled Plug Tail Systems. Some of these junction boxes eliminates the need for wire nuts. However, these junction boxes contain custom manufactured internal components. Thus, the junction boxes are more complex to use and more costly than traditional junction boxes.

However, in U.S. Pat. No. 8,613,624 to Alfredo Arenas, entitled Modular, Wiring system With Locking Elements, as with all the other referenced prior art patents, the wire terminations are at the rear of the junction box and are hidden from view. As such, the number of wires entering the box, the quality of the connections, and the paths of interconnections cannot be visually observed without disassembly and removal of the components within the junction box.

A need therefore exists for a system and method of connecting wires to switches, within a junction box, yet enables the wires and termination devices within the junction box, to be readily observed within a fully assembled application. A need also exists for the ability to connect all wires to the first dielectric body while having all switches connect to each other modularly, and without having exposed energized wires or screw heads. Another need is the ability to change which switch controls what line at any time without moving the wires. Still another need is to reduce installation time by not having to mark and keep track of wires going to fixtures. There is a need to shorten the installation process, by installing receptacles and switches in the roughing in phase. Still another need is to eliminate using supports in order to hang lights and fans. These needs are met by the present invention as described and claimed below.

REFERENCES CITED

| | |
|---|---|
| 6,309,248 January 2000 King | 7,052,313 April 2005 Gorman |
| 6,341,981 April 2000 Gorman | 7,189,110 January 2005 Savicki |
| 6,376,770 February 2000 Hyde | 7,357,652 October 2006 Arenas |
| 6,465,735 December 2000 May | 7,425,677 July 2006 Gates |

-continued

REFERENCES CITED

| | |
|---|---|
| 6,544,049 October 2000 Pierson | 7,497,725 November 2007 Savicki |
| 6,563,049 December 2000 May | 7,628,643 August 2008 Pyrros |
| 6,617,511 July 2002 Schultz | 7,666,010 February 2008 Arenas |
| 6,767,245 October 2001 King | 7,705,239 September 2008 Gates |
| 6,774,307 May 2002 Kruse | 7,736,175 March 2009 Savicki |
| 6,843,680 May 2003 Gorman | 7,749,018 August 2008 Benoit |
| 6,857,903 February 2001 Hyde | 7,754,967 March 2006 Kruse |
| 6,910,913 October 2003 Satern | 7,767,905 June 2008 Meyer |
| 6,939,179 April 2004 Kieffer | 7,780,470, May2008 Benoit |
| 6,945,815 June 2004 Mullally | 7,851,704, March 2007 Fitch |
| 6,994,585 October 2013 Beniot | 8,475,188 April 2012 Gosling |
| 8,243,402 February 2011 Benoit | 8,602,799 January 2013 Ganta |
| 8,267,719 August 2010 Benoit | 8,613,624 May 2011 Arenas |
| 8,344,250 January 2011 Padro | 8,649,133 August 2012 Benoit |
| 8,415,561 April 2010 Gates | |

BRIEF DESCRIPTION OF THE DRAWINGS

For a better understanding of the present invention, reference is made to the following description of exemplary embodiments thereof, considered in conjunction with the accompanying drawings, in which.

REFERENCE NUMERALS

S1. Plate
S2. Movable contacts: (screws, as one option)
S3. Parallel electrical line conductors
S4. Flexible contact
S5. Ground wire
S6a. User control element
S6b. User control element for the multi-purpose switch
S7. Dielectric body
S8. Power source cable
S9. Ground bus element
S10. Ground screws
S11. Black wire power line
S12. Neutral wire
S13. Extension points (of parallel connectors) for modulator connection to other switches
S14. Neutral wire (from power source)
S15. Extension points (connect power from one switch to another)
S16. Extension points (connect ground from one switch to another)
S17. Separation wall
S18. Prongs, used with engagement clips
S19. Extension points (connect neutral wire from one switch to another)
S20. #14 Black wire and neutral wire entry slot
S21. #12 Black wire and neutral wire entry slot
S22a Open Front & Side enclosure
S22b. Removable side cover
S23. Internal engagement clips
S24 Multi-purpose switch
S25 Recessed access to movable contacts
S26 Power and neutral entry slot for #12 wire cable,
S27 Front portion of switch assembly
S28 Cables going to devices, lights, fans, and the like
S29 Track for enclosure side cover
S30 connection between mechanical portion of switch and power line
S31 Power and neutral entry slot for #14 wire cable
S32 Ground attachment fitting, on two piece connector
S33 Front portion, of a two piece connector, for installing ceiling lights and/or fans, This portion gets attached to the receptacle/switch block
S34 Rear portion, of a two piece connector, wires from a fixture, are attached to this portion
S35 A spring loaded locking mechanism to attach Front portion (S33) to rear portion (S34)
S36 Wires coming from a device, light, fan, etc,
S37 Symbolic connection between the flexible contact and the plate

DETAILED DESCRIPTION OF THE DRAWINGS

Although the present invention connecting system can be embodied in many ways, the embodiments illustrated show the connecting system in its simplest embodiment for use in a single-gang junction box. These embodiments are selected in order to set forth the clearest manner to describe the invention. The illustrated embodiments, however, are merely exemplary and should not be considered a limitation when interpreting the scope of the appended claims.

Figure 1:
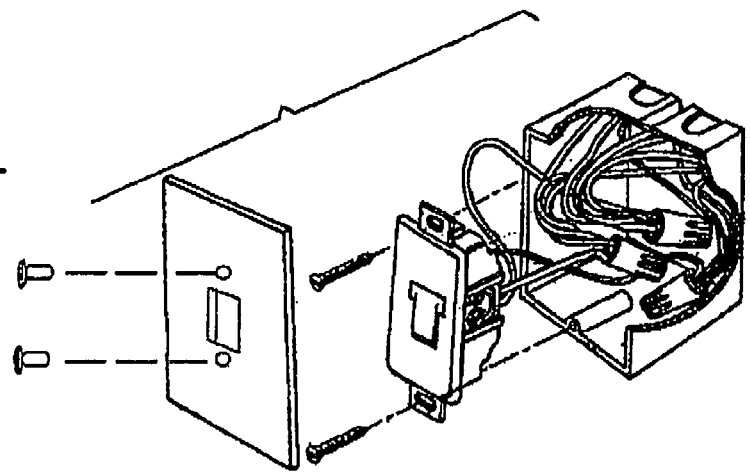
FIG. 1 is a perspective of prior art depicting an electrical switch inside of a junction box.
Figure 2:
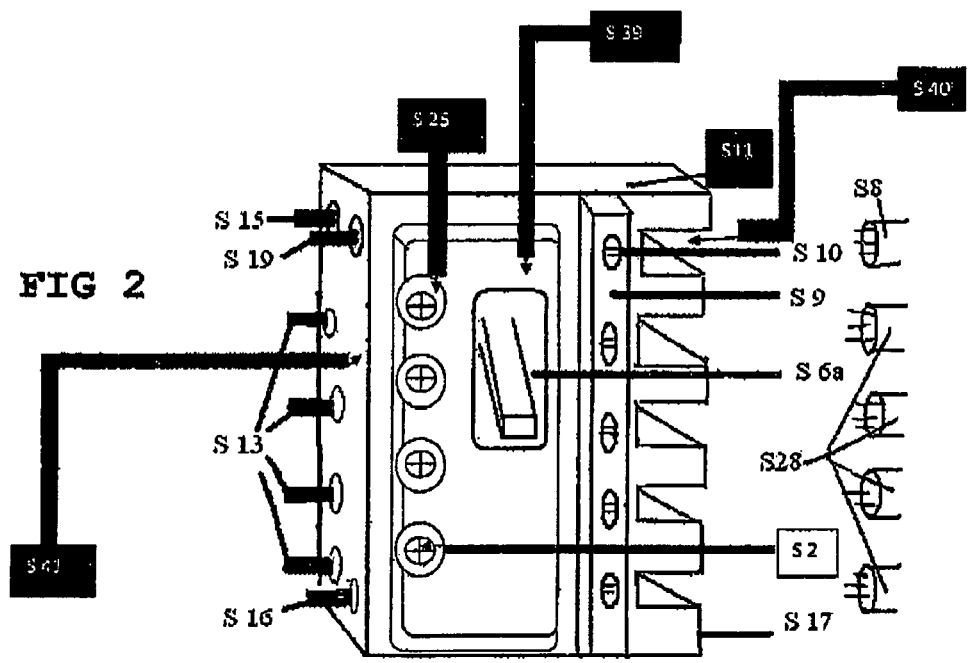
FIG. 2 is a perspective view of the present invention.
Figure 3:
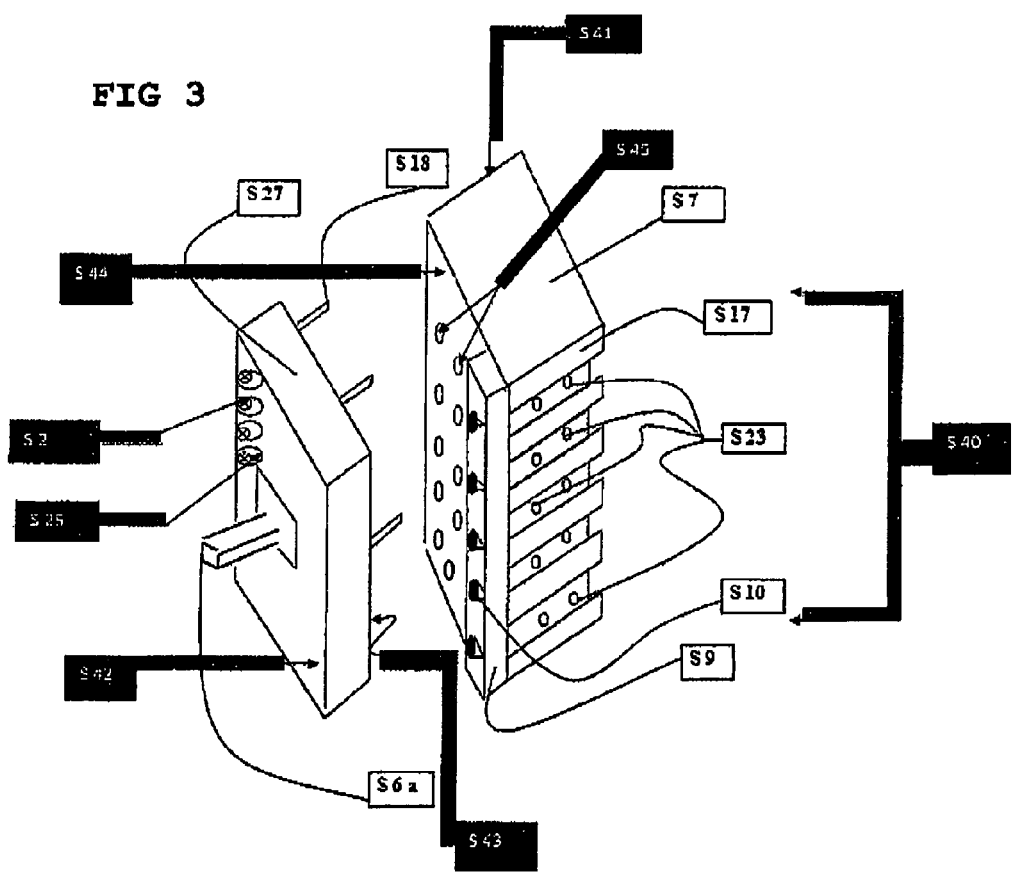
FIG. 3 is a perspective view of an alternate embodiment of the present invention.
Figure 4:
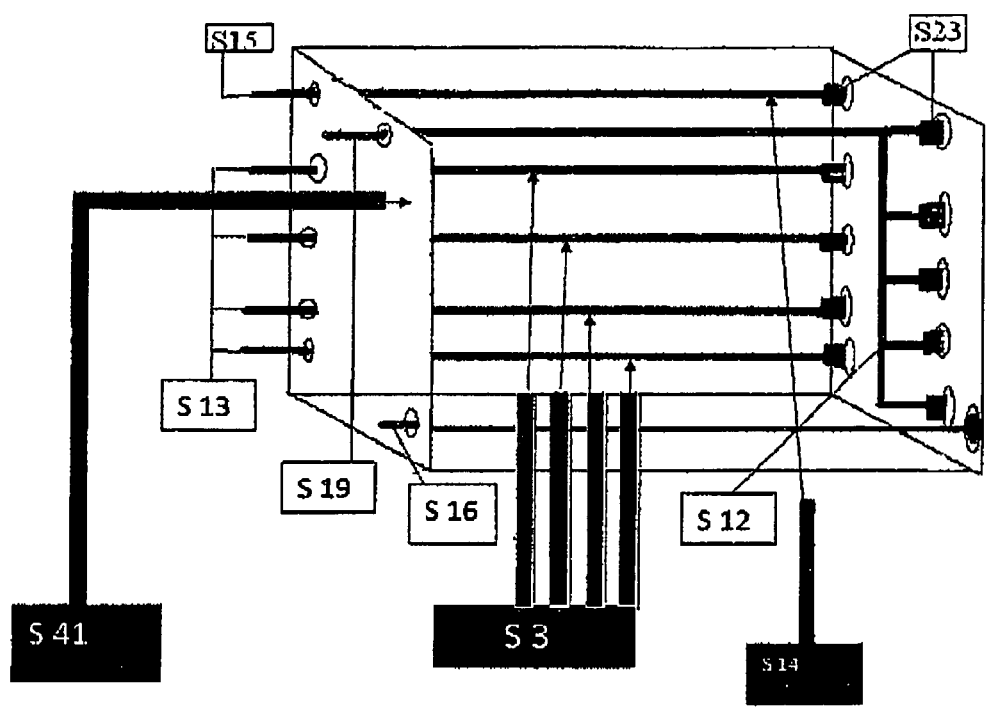
FIG. 4 is an exploded view of the internal wiring of the present invention.
Figure 5:
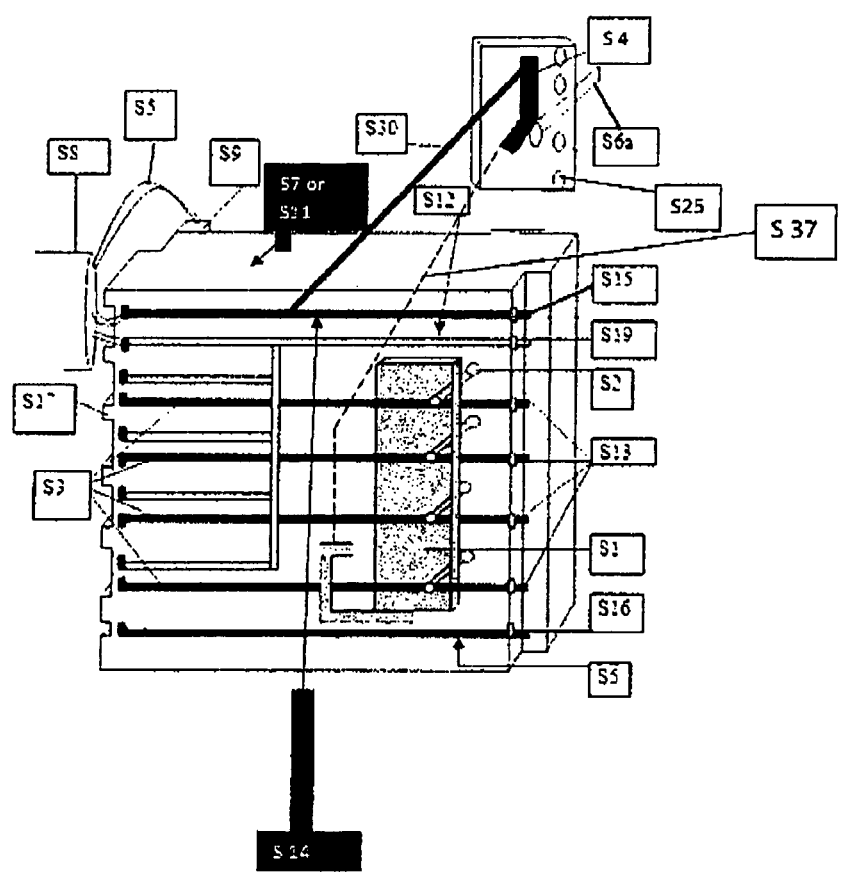
FIG. 5 is a back view of the wire device depicted in FIG. 2.
Figure 6:
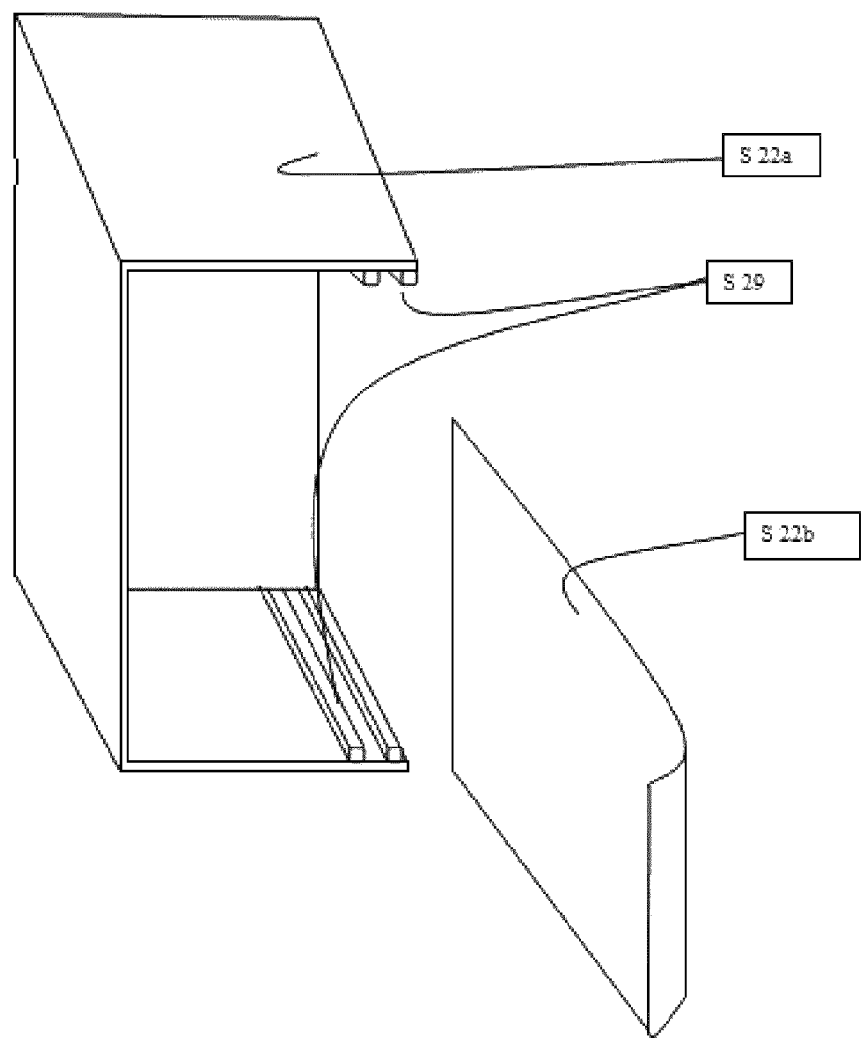
FIG. 6 is a front view of a junction box used to house the switch of FIG. 2.
Figure 7:
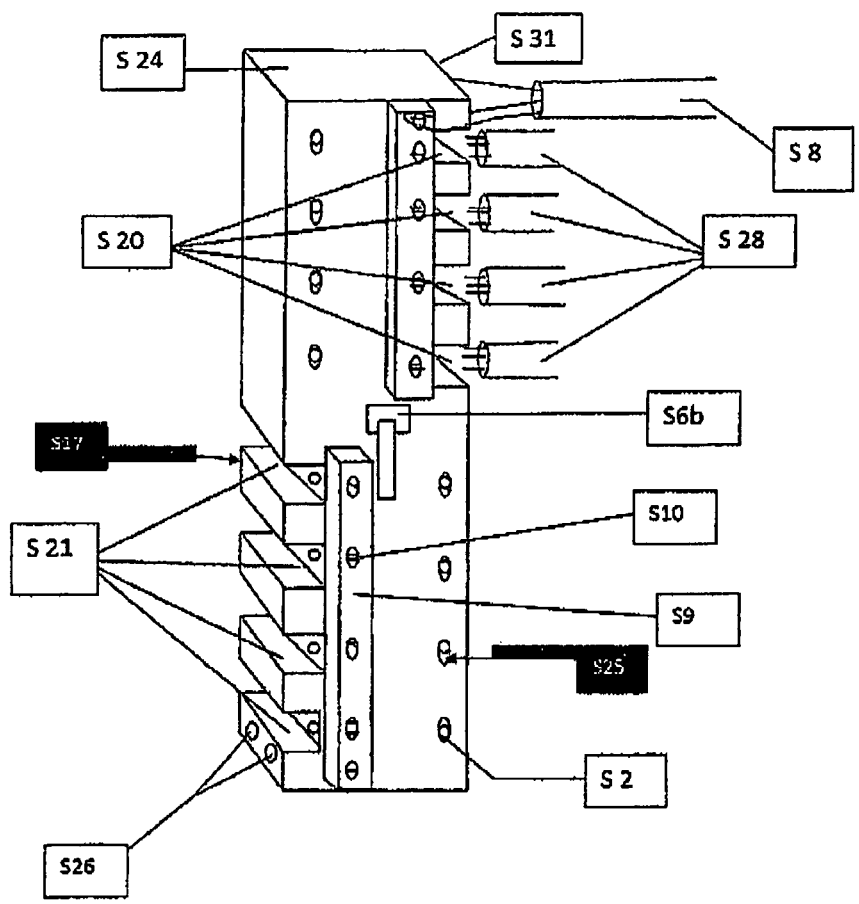
FIG. 7 is a front view of another embodiment depicting a multifunctional electrical switch
Figure 8:
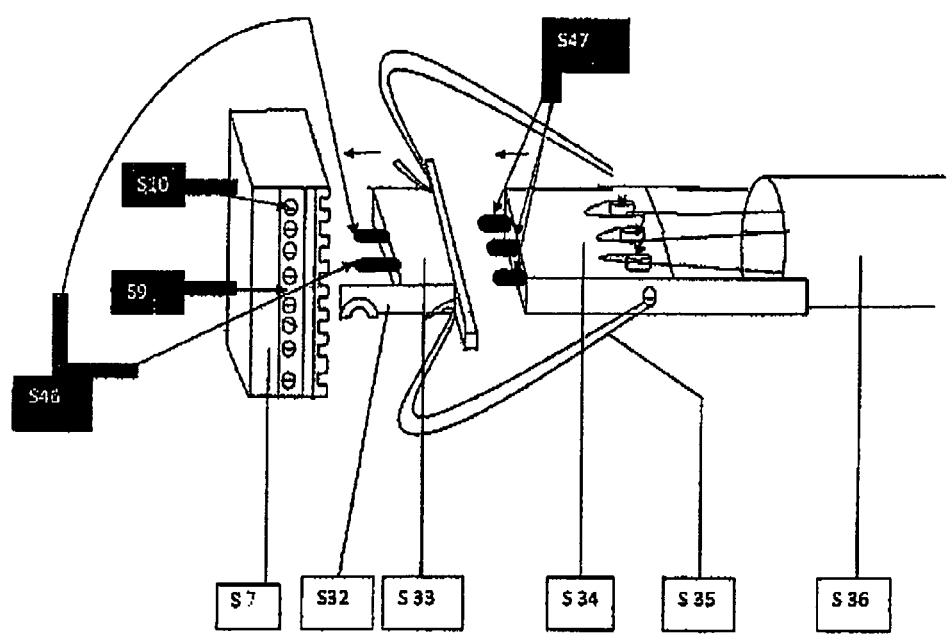
FIG. 8 is a detailed view illustrating a light/fan connector plug in accordance with the Second embodiment of the present invention

There is a three wire cable deposed near the top of the Time Saver Modular Electrical switch. It provides electrical power and continuity from a power source, to that switch. This cable contains a black wire, a neutral wire, and a ground wire. The power remains at this connection point until the user control element (S6) is turned to the ON position. When the switch is turned ON, the power goes to a plate (S1) with four screws (S2) going through it. The four screws become energized. These screws are recessed for safety and can be seen on the front surface of the switch assembly. (FIG. 2)

There are four parallel electrical conductors (S3) in the back of the switch. When a screw (S2) is seated, it makes contact with one of these conductors and power is sent back through the rear of the first switch. Each one of these parallel conductors is independent of each other, and transfers power (internally) out of the first switch through the side connected ports.

On the perpendicular side of the number one dielectric body, four independent cables (S28) are stacked vertically with a separation wall (S17) between them to prevent accidental touching. These cables are in direct contact with the parallel lines (S3), using internal engagement clips (S23). The black wire from the independent cable (S28) gets pushed into the black wire entry slot. The neutral wire from the independent cable (S28) gets pushed into the neutral wire entry slot. The ground wire is wrapped around the ground screw (S10), which is attached to a ground bus element (S9). The ground screws not only make a better connection, but they also hold all of the wires in place.

When an installation is complete, the switch works in the following manner:

When pushing the control element (S6) to the ON position, power goes from the power source (a cable) (S8) to the plate (S1) which energizes the screws (S2). Any screw (S2) that is seated on a parallel line (S3), transfers power to that line. That parallel line transfers power back through the first switch, to an independent cable (S18) with black, neutral, and ground wires on the perpendicular side of the first switch assembly, to an electrical device, light, fan or the like.

Switches one, two, three, and four are connected modularly to each other, and connect with the black, neutral and ground wires, from a cable (S28), through the number one switch assembly. No wires are attached to switches two, three or four. The screws (S2) are recessed on the switch to prevent accidental touching. You can turn the power source off when seating a screw, or just have the switch in the off position. A rubber tip can be added to the head of the connection screw to eliminate a shock hazard, should the installer not shut the power off or turn the switch to the off position. If you seat one screw (S2), one line will become energized. Seating two screws (S2) energizes two lines, etc.

With the power ON and the switch in the OFF position, you can change what switch controls which device by seating the screw (S2). This can be done before, during, or after a complete installation. This switch model, can power up four electrical devices at the same time, if desired. All wires are connected to the number one switch assembly. All neutral wires are connected internally in the number one switch assembly.

Generally speaking, one connection screw (S2) per switch would be seated and would control one device. This model shown is designed, but not limited to, four switches for clarity. Many more cables and horizontal lines can be designed into a switch, making it possible to control many more devices The multipurpose switch is unlike any standard switch in that it does not turn a circuit ON and Off. The user control element, in one position connects a 15 AMP wire, to its destination device, such as a light. In the other position, it may connect a 20 Amp wire, to its destination device, depending on design.

It will be understood that the embodiments of the present invention that are illustrated and described are merely exemplary and that a person skilled in the art can make many variations to those embodiments. For instance, the connection screws can be replaced by push buttons or a sliding connector. Likewise, the electrical/mechanical switch can be modified to make contact by other means. The front portion of the switch can be manufactured as part of the dielectric body or may be a removable plug-in unit. All such embodiments are intended to be included within the scope of the present invention as defined by the claims.

What is claimed is:

1. An assembly comprising:
    a dielectric body having a prong receiving surface, containing a plurality of electrical connection ports, and a perpendicular surface containing a plurality of corresponding said electrical connection ports;
    a termination device; a switch assembly, deposed to said front prong receiving surface of said dielectric body, wherein said termination device is installed internally to said prong receiving surface of said dielectric body;
    an electrically independent grounding bus element coupled to said dielectric body;
    a series of prongs on a multiservice connecting surface to interconnect, a black, a neutral, and a ground wire from a power source, including at least some parallel electrical line conductor prongs, supplying power to a fixture, from said switch assembly to a plurality of switch assemblies;
    a junction box with a front and a side opening, sized to fit a fully wired said dielectric body with said termination device;
    a said fully wired dielectric body, with said termination device, installed into said junction box, without having to sit or kneel;
    the said fully wired dielectric body, within said junction box, with said termination device, and having no exposed components energized, while all engaged wiring connections are visible, in a fully assembled application;
    a set of movable adjustable contacts, which when seated, engage at least one said parallel electrical line conductor;
    the said fully wired dielectric body that can be installed in the roughing in process.

2. The assembly according to claim 1, an alternative embodiment being; a removable assembly housed in a non-conductive body, having an anterior surface and a posterior surface, said anterior surface—incorporates a user control element with access to said movable/adjustable contacts, said posterior surface incorporates a plurality of prongs configured to engage at least some corresponding prong receiver ports, on said prong receiving surface, on said dielectric body.

3. The assembly according to claim 1,
    a plurality of at least some said prong receiving surface electrical connection ports, being electrically connected, to at least some said perpendicular surface electrical connection ports whereby said perpendicular surface connection ports are configured to receive an entry wire.

4. The assembly according to claim 1, a common electrical switch mechanism consisting of a flexible arm contact, positioned by a user control element, configured to be coupled to at least one said movable/adjustable contact.

5. The assembly according to claim 1, further comprising;
    at least one said parallel electrical line conductor, of said dielectric body, wherein at least one said perpendicular surface electrical connector port is attached at one end, further including at least one said multiservice connecting surface's prong attached to the opposite end of said parallel electrical line conductor.

6. Yet another alternative embodiment;
    a multipurpose switch, coupled to either of two different optional sized wires, wherein the user control element directs electrical energy to either line.

7. The assembly according to claim 1,
    easy access to recessed said movable/adjustable contacts, on a forward facing and an anterior surface of said switch assemblies, allowing user to quickly change said switch assemblies' electrical line control without moving wires or said switch assemblies.

8. The assembly according to claim 7,
    Wherein the functionality of said electrical line control eliminates:
        exposed electrically charged wires or screw heads;
        the need to rewire said switches to disconnect said switch;
        the need to rewire said switches to change the order of said user control element within a said junction box;
        the need to use wire nuts and pigtails;
        the need to indicate on each electrical line, what fixture said electrical line controls.

9. The assembly according to claim 1,
    wherein all wires are connected to the first said dielectric body of said switch assembly, thereby allowing all said assemblies to be connected modularly to each other.

10. The assembly according to claim 2,
the said plurality of prongs incorporated on said posterior surface of said switch assembly, configured to specific said prong receiving surface's prong receiver electrical connection ports, whereby use of incorrectly installed sized wire or use of an incorrect said switch assembly, to a said dielectric body, warrants the said switch inoperative.

11. The assembly according to claim 2,
a two piece modified connector, whereby one piece is coupled to a wire leading to a fixture, the other attaches to said dielectric body for electrical continuity, inside the junction box, whereby a quick engagement of both parts, eliminates the needed temporary said fixture support.

* * * * *